United States Patent
Mesa Gonzalez et al.

(10) Patent No.: US 11,174,052 B2
(45) Date of Patent: Nov. 16, 2021

(54) BEVERAGE CAPSULE REFILLING DEVICE AND BEVERAGE CAPSULE REFILLING METHOD

(71) Applicant: Klapcap Solutions, S.L., Barcelona (ES)

(72) Inventors: Guillermo Alejandro Mesa Gonzalez, Barcelona (ES); Carlos Torrente Bonatti, Barcelona (ES); Pau Roviras Sampere, Barcelona (ES); Ferran Badia Ortega, Barcelona (ES); Sonia Adalid Fuentes, Barcelona (ES)

(73) Assignee: Klapcap Solutions, S.L., Barcelona (ES)

( * ) Notice: Subject to any disclaimer, the term of this patent is extended or adjusted under 35 U.S.C. 154(b) by 144 days.

(21) Appl. No.: 16/098,496

(22) PCT Filed: Apr. 25, 2017

(86) PCT No.: PCT/ES2017/070250
§ 371 (c)(1),
(2) Date: Nov. 2, 2018

(87) PCT Pub. No.: WO2017/191343
PCT Pub. Date: Nov. 9, 2017

(65) Prior Publication Data
US 2019/0144151 A1 May 16, 2019

(30) Foreign Application Priority Data
May 2, 2016 (ES) .................. ES201630566

(51) Int. Cl.
B65B 29/02 (2006.01)
A47J 31/06 (2006.01)
(Continued)

(52) U.S. Cl.
CPC ......... *B65B 29/022* (2017.08); *A47J 31/0689* (2013.01); *B65B 7/164* (2013.01);
(Continued)

(58) Field of Classification Search
CPC ....... B65B 29/022; B65B 7/164; B65B 7/165; B65B 7/285; B65B 67/02; B65D 85/8043; A47J 31/0689
See application file for complete search history.

(56) References Cited

U.S. PATENT DOCUMENTS

| | | | |
|---|---|---|---|
| 3,884,017 A | 5/1975 | Butcher | |
| 4,692,201 A | 9/1987 | Zodrow | |

(Continued)

FOREIGN PATENT DOCUMENTS

| | | |
|---|---|---|
| BE | 827.545 A1 | 4/1975 |
| CN | PCT/CN2014/085177 | 3/2016 |

(Continued)

OTHER PUBLICATIONS

Seal Pod reusable Nespresso capsules, [on line] Jul. 15, 2015, retrieved Jun. 9, 2020. Retrieved from the Internet: URL<https://www.amazon.com/Reusable-Nespresso-Capsules-Refillable-OriginalLine/dp/B00WOWZ74Q?th=1>.*

(Continued)

*Primary Examiner* — Viren A Thakur
*Assistant Examiner* — Chaim A Smith
(74) *Attorney, Agent, or Firm* — Thedford I. Hitaffer; Hitaffer & Hitaffer, PLLC

(57) ABSTRACT

The aim of the present application is to register a conventional beverage capsule refilling device of the type that comprises a cup bindable to a sealing sheet; and a beverage capsule refilling method, such that it makes it possible to reuse the existing capsules, generally made of plastic, in a simple, quick, clean, reliable and ecological manner.

17 Claims, 8 Drawing Sheets

(51) Int. Cl.
  *B65B 67/02*  (2006.01)
  *B65B 7/16*  (2006.01)
  *B65B 7/28*  (2006.01)
  *B65D 85/804*  (2006.01)
(52) U.S. Cl.
  CPC .............. *B65B 7/165* (2013.01); *B65B 7/285* (2013.01); *B65B 7/2878* (2013.01); *B65B 67/02* (2013.01); *B65D 85/8043* (2013.01)

(56) References Cited

U.S. PATENT DOCUMENTS

2007/0144357 A1* 6/2007 Rivera .................. B65B 29/022
  99/295
2016/0130046 A1* 5/2016 Keller .................. B29C 66/112
  220/259.1

FOREIGN PATENT DOCUMENTS

| FR | 2972180 A3 | 9/2012 |
| WO | 2016/029355 A1 | 3/2016 |

OTHER PUBLICATIONS

"Refill Nespresso capsules!", retrieved from the Internet: URL:https://www.youtube.com/watch?v=efjFS73AC2I on Oct. 20, 2015.
WIPO, International Search Report, dated Jul. 18, 2017, in International Application No. PCT/ES2017/070250, filed Apr. 25, 2017.
WIPO, International Written Opinion, dated Jul. 18, 2017, in International Application No. PCT/ES2017/070250, filed Apr. 25, 2017.

* cited by examiner

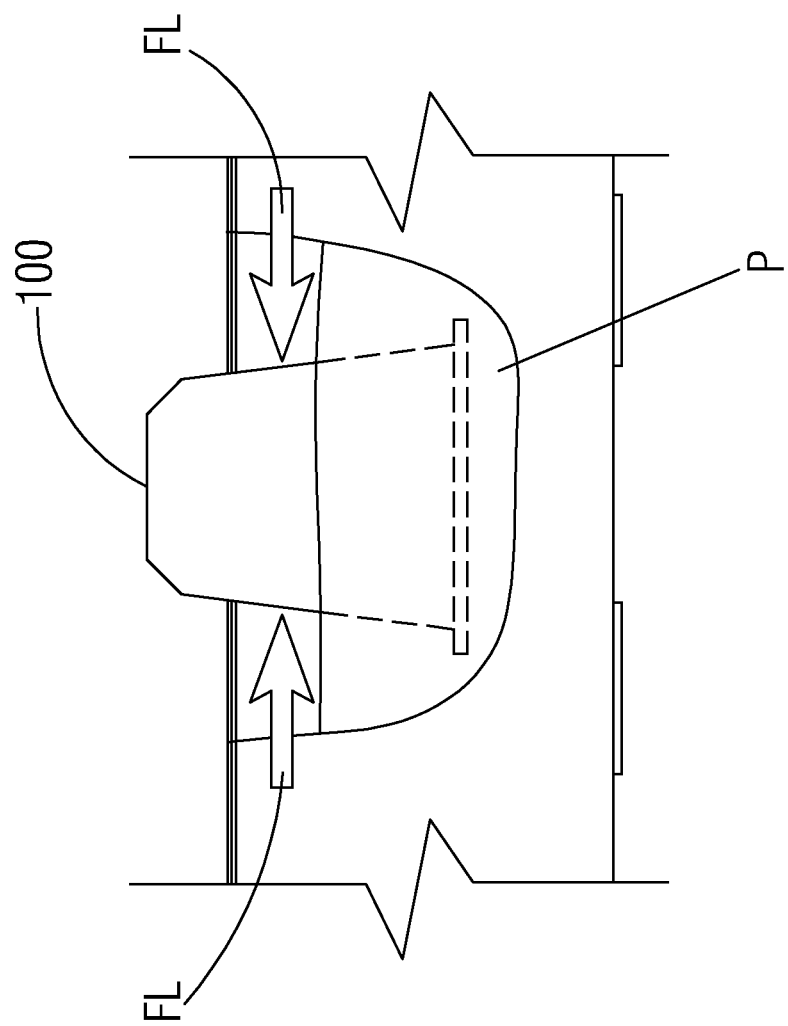

BEVERAGE CAPSULE REFILLING DEVICE AND BEVERAGE CAPSULE REFILLING METHOD

CROSS-REFERENCE TO RELATED APPLICATIONS

This application, filed under 35 USC 371, is a United States National Stage Application of International Application No. PCT/ES2017/070250, filed Apr. 25, 2017, which claims priority to ES Application No. P201630566, filed on May 2, 2016, the disclosures of which are incorporated herein by reference.

OBJECT OF THE INVENTION

The aim of the present invention is to register a conventional beverage capsule refilling device and a method for refilling beverage capsules which incorporates notable innovations.

More specifically, the invention proposes the development of a device that allows for simple and clean refilling, and furthermore a method for refilling the capsules that, due to its simple characteristics, facilitates its use in domestic or office settings, particularly for coffee makers of a known type.

BACKGROUND OF THE INVENTION

Coffee makers that produce coffee or a beverage through the infusion of ingredients contained in a disposable capsule are widely known. Each time a beverage is to be made, it is necessary to use a capsule that must be acquired previously. In general, this can involve a relatively high cost in comparison to other traditional coffee-making systems. It further requires a forecast of sufficient stock so as to not be left without capsules. Another disadvantage is that the user is not free to choose the content of the capsules, such that they cannot control the organoleptic characteristics of the beverage to their liking.

With the aim of reusing already infused capsules, more or less rudimentary proposals for domestic and/or office settings and more complex proposals for small coffee producers are known.

In domestic settings, these proposals should make it possible, in theory, for the user to refill and seal capsules with a relatively low and simple cost (not very much in many occasions). Additionally, it must be considered that the solutions are hardly practical and they require a very long refilling time per capsule. Sometimes methods such as refilling the capsule with a spoon are used, which involves product loss, creates a mess and the coffee does not end up homogeneously pressed. No part of the capsule is fastened, and therefore there is a risk of spilling the product before it is sealed with a sealing sheet. It also implies the use of sealing sheets with some kind of adhesive in order to join with the refilled capsule, with which specific sealing sheets endowed with adhesive or specific parts must be obtained in order to guarantee the binding of the sheet to the capsule during the infusion process of the ingredient. The use of specific sheets with adhesive further implies that the capsules must be correctly washed in order to eliminate the remaining adhesive.

Other proposals include the use of specific capsules with opening covers, generally manufactured from plastic that must be refilled with a spoon, for example, such that the need to buy the cited capsules with a limited number of uses must be added to the previously cited disadvantages for domestic solutions.

Regarding the proposals for small coffee producers, they involve complex electronic fixtures that make it possible to refill coffee capsules to be sold thereafter. They are intended for small coffee producers or distributors that want to sell their own coffee with their own brand. They require an investment cost that is relatively feasible if it can be spread out over a large number of units sold, but that would be too high for an end consumer. These solutions are not suitable for an individual user at a domestic level.

There is therefore a clear need for a simple, robust and reliable capsule refilling device, with a feasible acquisition cost for most individual users.

DESCRIPTION OF THE INVENTION

The present invention has been developed with the aim of providing a device and a method that solve the disadvantages mentioned above while also contributing other additional advantages, which will become clear from the description provided below.

When the beverage ingredients or product are cited in the present invention, preferably ground coffee should be understood, even though the use of other food products necessary for making a drinkable beverage should not be dismissed.

The use of the positioning terms upper, lower, above, beneath, lateral etc. should be understood in the present application in relation to a situation when the invention is in use.

It is worth noting that the capsule is not part of the object of the present application, and that since it involves refilling, it is capable of being performed on capsules that have not been used previously or others that are reused.

Therefore, an object of the present invention is a beverage capsule refilling device, with capsules of the type that comprise a cup bindable to a sealing sheet, comprising a support that in turn comprises a base bound at least to one lateral wall, thus defining a cavity able to house a capsule to be refilled, the support comprising positioning means for the capsule; further comprising a lid-type cover for said cavity, the cover in turn comprising a piston body and a piston base body, in which the piston body has an oblong configuration and with a hollow arranged at least partially along the piston body, and the piston base body comprising a free passage by way of an opening in which the piston body is arranged in a sliding manner, comprising elastic means between the piston body and the piston base body, fastening means for the sheet being provided that are configured to secure a sheet in a coupled condition between the support and the cover, the cover comprising compression means arranged at least partially in the hollow and capable of coming into contact with the sheet in a coupled condition; the piston body further comprises cutting means oriented towards the cavity of the support when in use, the piston body and the cavity being dimensioned such that said piston body is capable of being introduced at least partially between the cavity and the capsule in a coupled condition, the compression means comprising a moldable body dimensioned such that at least one portion of the moldable body is expandable between the capsule and the cutting means in a coupled condition.

The expression "coupled condition" should be understood as that condition of use in which the cover is in contact with the support such that the cover covers the cavity capable of housing a capsule to be refilled.

By means of the previous characteristics a device is achieved that makes it possible to reuse the existing capsules, generally made of plastic, in a simple, quick, clean, reliable and ecological way. With the device, the placement of a sheet with a suitable composition and configuration is achieved, without specific dimensions, since the device itself cuts said sheet to length. Once cut, the sheet can be perfectly molded to the capsule by means of the compression means without the user needing to do it manually, preventing risk of spilling. The positioning means allow for the capsule to be placed comfortably without needing to fasten it manually. It prevents the capsule from turning over and the consequent loss of product, thereby preventing messes.

The cutting means can make the cut in the suitable shape for each case, circle-, rectangle-, oval-shaped, etc. and the user can place the sheet without endowing it with that shape, since the device takes care of it. For example, if there is a circular capsule that needs to be sealed, cutting the sheet by hand as done in the state of the art ends up being especially complex.

The piston allows for cutting and wrapping the sheet over the capsule that is firmly fastened to the device. With a single movement, the device automatically carries out all the operations of positioning the capsule, cutting the sheet and sealing, which were done manually until now.

The fact that the compression means are positioned at least partially in the hollow and can come into contact with the sheet, together with the fastening means, facilitates the cutting and the subsequent molding of the sheet to the capsule. The cut sheet is able to be centered and adapted to the outline of the capsule, keeping it sealed and suitable for its use.

Another advantage of the present invention is that it does not need to use adhesives, given that the cut sheet stays folded over the edges where the capsules known in the state of the art are heat sealed.

The invention allows the user to achieve predictable results over and over again with the capsule seal through the sheet. The exact amount of sheet will always be cut in order to precisely adapt afterwards to the outline of the capsule.

According to a characteristic, the support further comprises a storage receptacle capable of receiving food ingredients and the cover further comprises an enclosing bulge for the storage receptacle. In this way the user can store, for example, one or several mixed classes of ground coffee that are quickly and easily at hand.

In order to facilitate the refilling operation even more, the support further comprises a straightening tab connected to the storage receptacle. This advantageously connected tab, in other words oriented towards the receptacle, removes the excess ground coffee in the capsule that was previously filled in the storage receptacle, so that the excess falls back into the receptacle.

According to a characteristic, the support and the cover are linked by a hinge-type articulation. This allows for a relative movement to be achieved between the support and the cover as if it were a compass in order to obtain a simple coupled condition. This also contributes to a compact design for the device.

The piston body can comprise a button-type surface on an end opposite to the cutting means. This surface allows the user to apply a force in a simple manner for cutting and closing the sheet over the capsule.

In one embodiment, the cutting means comprise toothing arranged on an edge of the piston body. This cutting arrangement is advantageous since with one single movement of the piston body the sheet can be cut to length, and it further makes it possible to obtain a compact design for the piston body assembly. The sheet is trimmed easily, simply and precisely. The amount of material for the sheet is the right and necessary amount, in this way preventing material from being wasted. Furthermore, upon adjusting the shape of the sheet, with the cutting means the presence of excess sheet that may "bother" the user is avoided when it is sealed according to the state of the art.

The elastic means can comprise a ring of elastic material arranged around the body of the piston or a helical spring arranged around the piston body. It makes it so the piston body returns to its resting position after use.

In order to comfortably and securely position the capsule to be sealed, the positioning means can comprise a depression or a projection in the base, configured for housing, at least partially, and in a male-female manner a capsule to be refilled.

The fastening means can comprise at least a first ridge provided on the upper edges of the lateral wall and at least a pair of second ridges provided on the piston base body; said ridges being arranged such that the first ridge is positioned between the second ridges in a coupled condition. The fastening means would then be arranged on the cover and on the support. In this way, the previously placed sheet can be retained in a simple manner.

Advantageously, the moldable body can be made of foam or a gel. Both materials make it possible to carry out the double function of the compression means, in other words, to make the sheet taut before being cut by the cutting means and at the same time expanding between the lateral walls of the capsule immediately after the cut, thus making them push the extra sheet jutting out around the capsule such that it is "hugged" around an edge that the capsules on the market usually have.

In order to achieve a compact configuration of an assembly for refilling existing capsules, the present device can have a configuration in which the cavity and the storage receptacle are arranged contiguously on the same plane. In this way, the capsule can be refilled and immediately sealed with a sheet. Being on the same plane does not keep them from being able to be on different levels or even with relative inclination.

The sheet to be applied can advantageously be made of aluminum foil. This characteristic allows for the device operations of the present invention to be very simple with a material available to any consumer and with a reasonable price compared to the disposable refilled capsules and the solutions that imply the use of pre-cut sheets with the suitable dimensions for a specific type of capsule and the use of some kind of adhesive. Aluminum foil can also be perforated by the beverage-making machine such as a capsule coffee maker.

If one wishes to heat seal the sheet to the rest of the capsule that has been refilled, the present beverage capsule refilling device can comprise a heat-sealing device between the cover and support.

Another object of the present invention is a beverage capsule refilling method, with the type of capsules that comprise a frustoconical cup able to be bound to a sealing sheet, comprising an ingredient filling phase in which the mouth of the capsule to be refilled is oriented towards a mass of ingredient and is introduced at least partially into said mass, such that the frustoconical cup is refilled with ingredient through the application of a predetermined force on lateral portions of the frustoconical cup.

By means of these characteristics the capsule can be refilled without needing any other utensil such as a spoon, funnel or dispenser which considerably speeds up the process. With slight pressure the mass of product can be compacted, while at the same time the lateral portions are held onto via friction.

According to an additional characteristic and when using a capsule refilling device as described previously, after the ingredient refilling phase, the cup is bound to a sealing sheet through the placement of a sheet between the support and the cover, and the actuation of the piston body in the direction of the capsule positioned in the cavity in a coupled condition.

Additionally, through the actuation of the piston body, the sheet is then cut and a fringe of excess sheet is folded back over the cup by the partially expanded compression means between the capsule and the cutting means in a coupled condition.

By means of these characteristics a method is achieved in which through only one actuation of the piston body, the sheet is firmly fastened, cut at length and sealed onto the capsule.

Advantageously, a sheet of aluminum foil is used. Aluminum foil is a product that is essentially found in all homes and allows it to have a relatively low cost. It can be molded perfectly to the outline of the capsule and works in elevated temperatures.

Other characteristics and advantages of the device and method objects of the present invention will become clear in light of the description of a preferred, though non-exclusive, embodiment, which, by way of a non-limiting example, is illustrated in the accompanying drawings, wherein:

BRIEF DESCRIPTION OF THE DRAWINGS

FIG. 5.—A schematic profile view and partial cross-section of a capsule to be reused in a storage receptacle;

DESCRIPTION OF A PREFERRED EMBODIMENT

Figure 1:
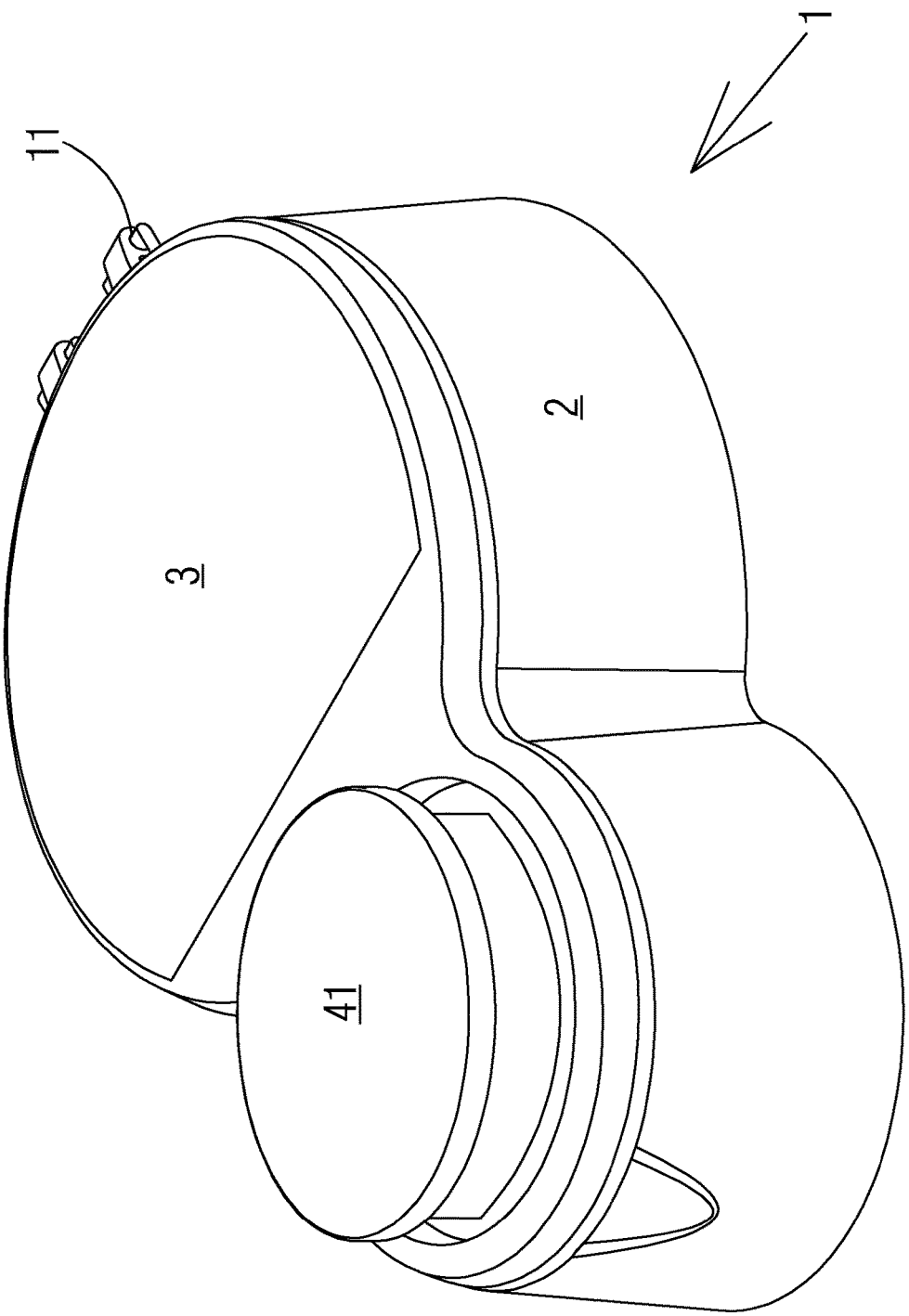
FIG. 1.—A schematic perspective view of a beverage capsule refilling device according to the invention.

As seen in the attached figures, a preferred but non-exclusive embodiment has been represented of the beverage capsule refilling device of the present invention designated with reference number 1. Some elements that cannot be seen have been represented with dashed lines for the purposes of clarity.

In the attached figures a beverage capsule 100 refilling device 1 is illustrated. These capsules 100 are of the type that comprise a cup 104 bindable to a sealing sheet 200. It is known that there is a great variety of models on the market that vary in shape, capacity, materials, etc., for which any of them could be used in the present invention; notwithstanding and by way of example for the description of the preferred embodiment of the refilling device 1, capsules with a frustoconical cup 104 made of aluminum or plastic and with edges 102, wherein they are heat sealed or sealed with adhesive to the capsules 100 available on the market, lateral portions 101 bound to the edges and a bottom 103 that seals the capsule 100 below could be used. This bottom 103 has a beveled circular perimeter. Furthermore, the layout of the capsule 100 in this case will be circular.

Continuing with the description of the refilling device 1, it can be seen that it comprises a support 2, that in turn comprises a base 21 bound to a lateral wall 22, thus defining a cavity 23 able to house a capsule 100 to be refilled. As already mentioned, in this embodiment the capsule 100 has a circular layout for which reason there is a single lateral wall 22, also with a circular layout. In other embodiments, this single lateral wall 22 configuration can change in order to adapt to the outline of the capsule 100.

Figure 2:
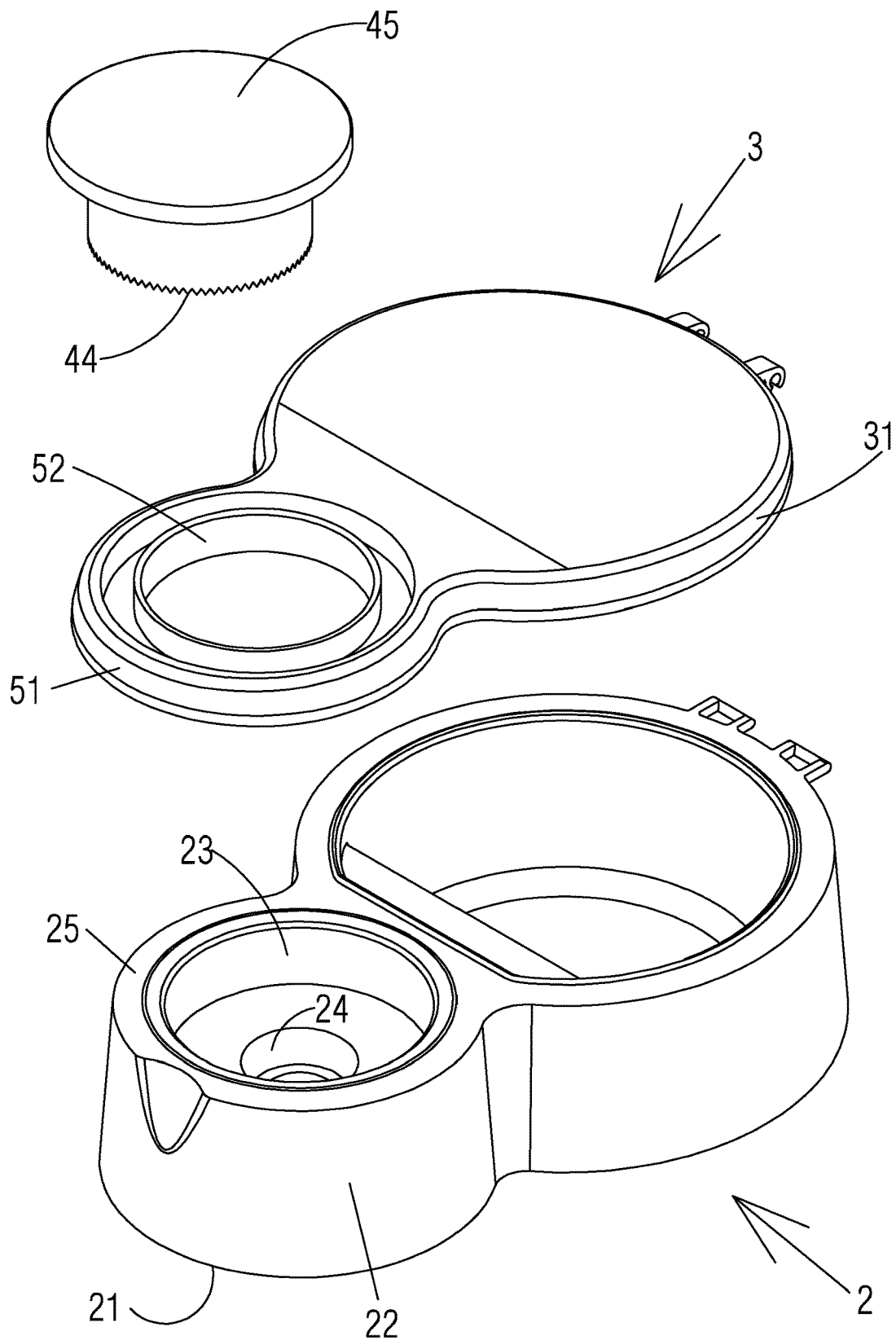
FIG. 2.—A schematic exploded view of the device of FIG. 1.

The support 2 also comprises positioning means 24 for the capsule 100; in this embodiment, the positioning means 24 comprise a depression in the base 21 (see FIG. 2) configured in order to partially house the capsule 100 to be refilled. In other cases that are not illustrated, instead of a depression there is a projection, but in any case they effectively fasten the capsule 100, preventing it from falling.

The invention also comprises a lid-type cover 3 for said cavity 23, the shape of a portion of said cover 3 will be complementary to the outline of the cavity 23, in this case with a circular layout. The cover 3 in turn comprises a piston body 41 and a piston base body 51.

The piston body 41 has an oblong configuration and, in this hollow embodiment, with a hollow 42 that in this case is arranged along the entire piston body 41; although in other embodiments that are not illustrated, said hollow 42 will only be partially arranged in the longitudinal direction of the piston body 41.

Figure 3:
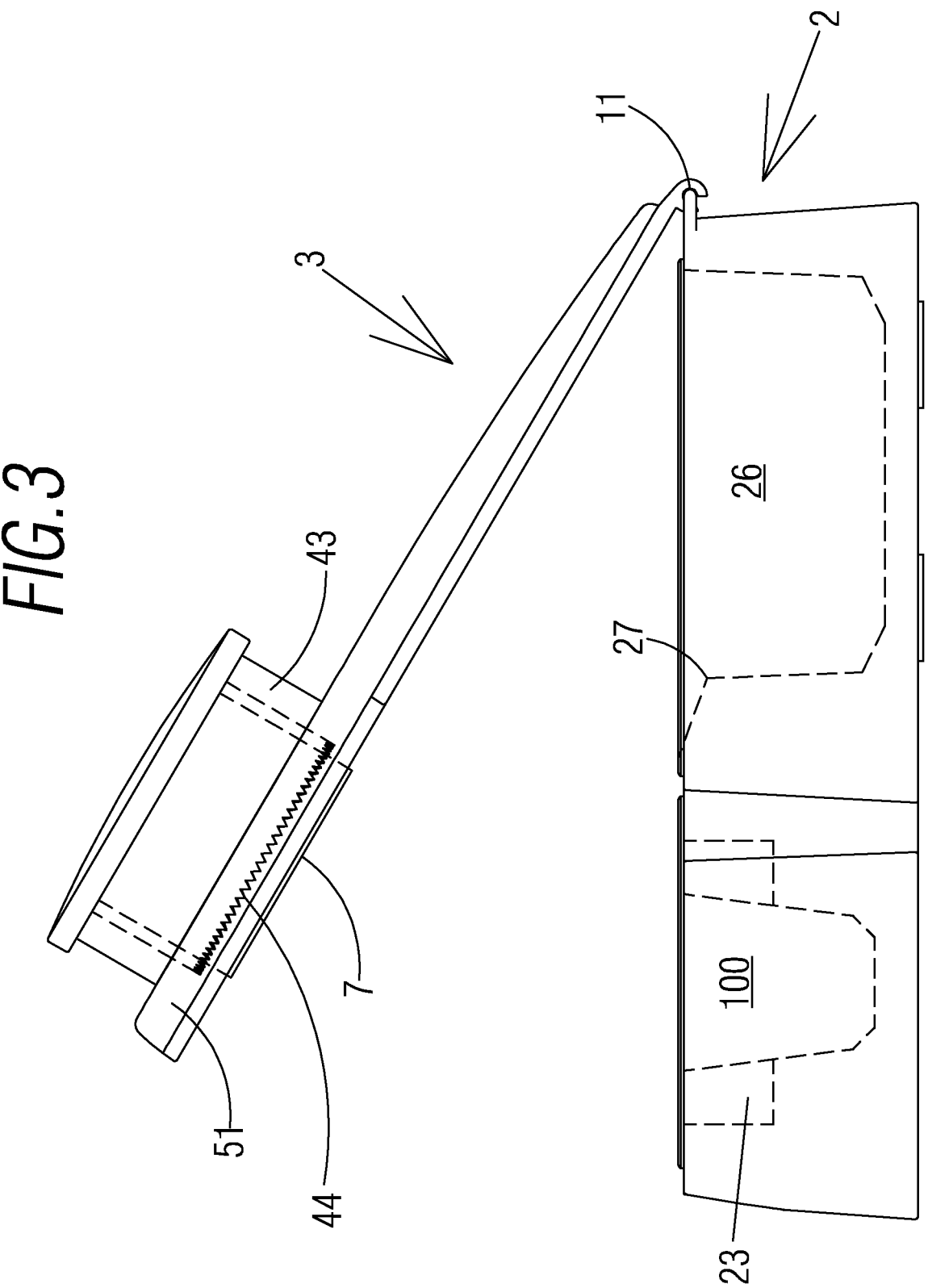
FIG. 3.—A profile view of the device of FIG. 1 in an open condition.
Figure 4:
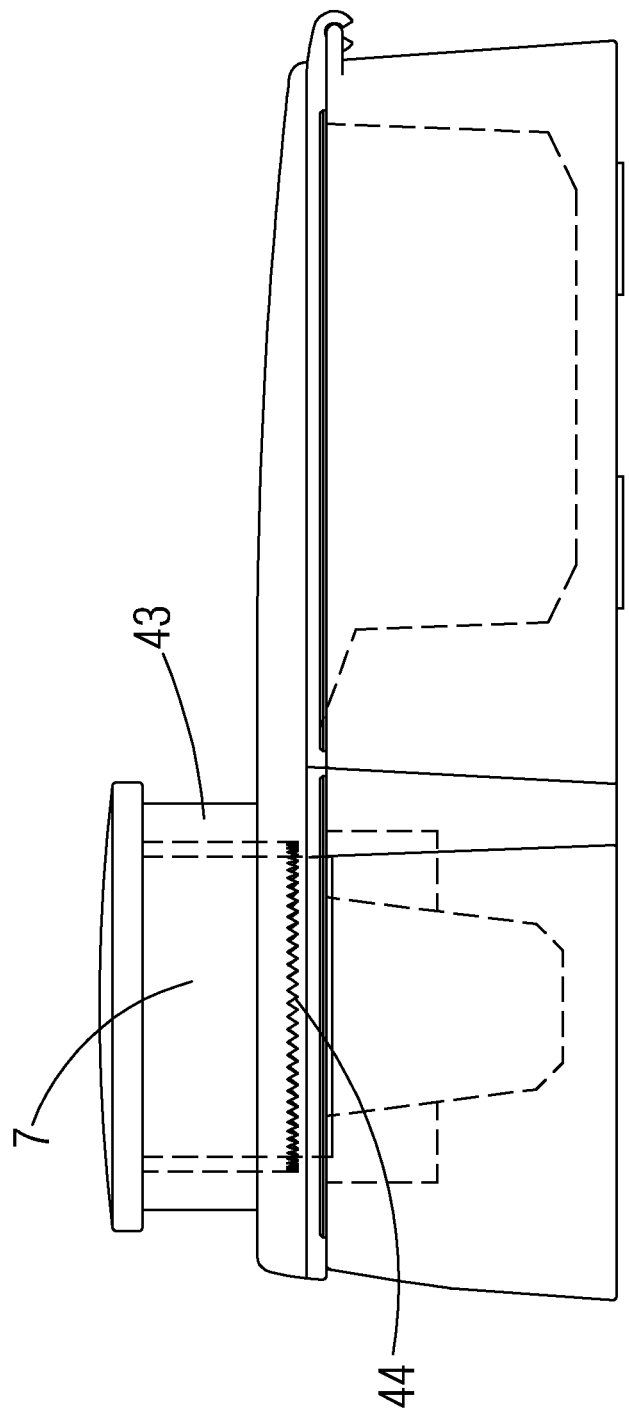
FIG. 4.—A profile view of the device of FIG. 1 in a coupled condition.

In turn the piston base body 51 comprises a free passage 52 or opening in which the piston body 41 is arranged in a sliding manner. It is evident that the free passage 52 will able to take any shape coinciding with the outline of the piston body 41, and, in this case, that would be a circular shape. In FIGS. 3 and 4 it can be seen that between the piston body 41 and the piston base body 51 there are elastic means 43 that allow the piston body 41 to return after its use. In said figures the elastic means 43 comprise a ring of elastic material arranged around the piston body 41, for example, foam. As an alternative (not shown), the elastic means 43 can comprise a helical spring arranged around the piston body 41.

Figure 7:
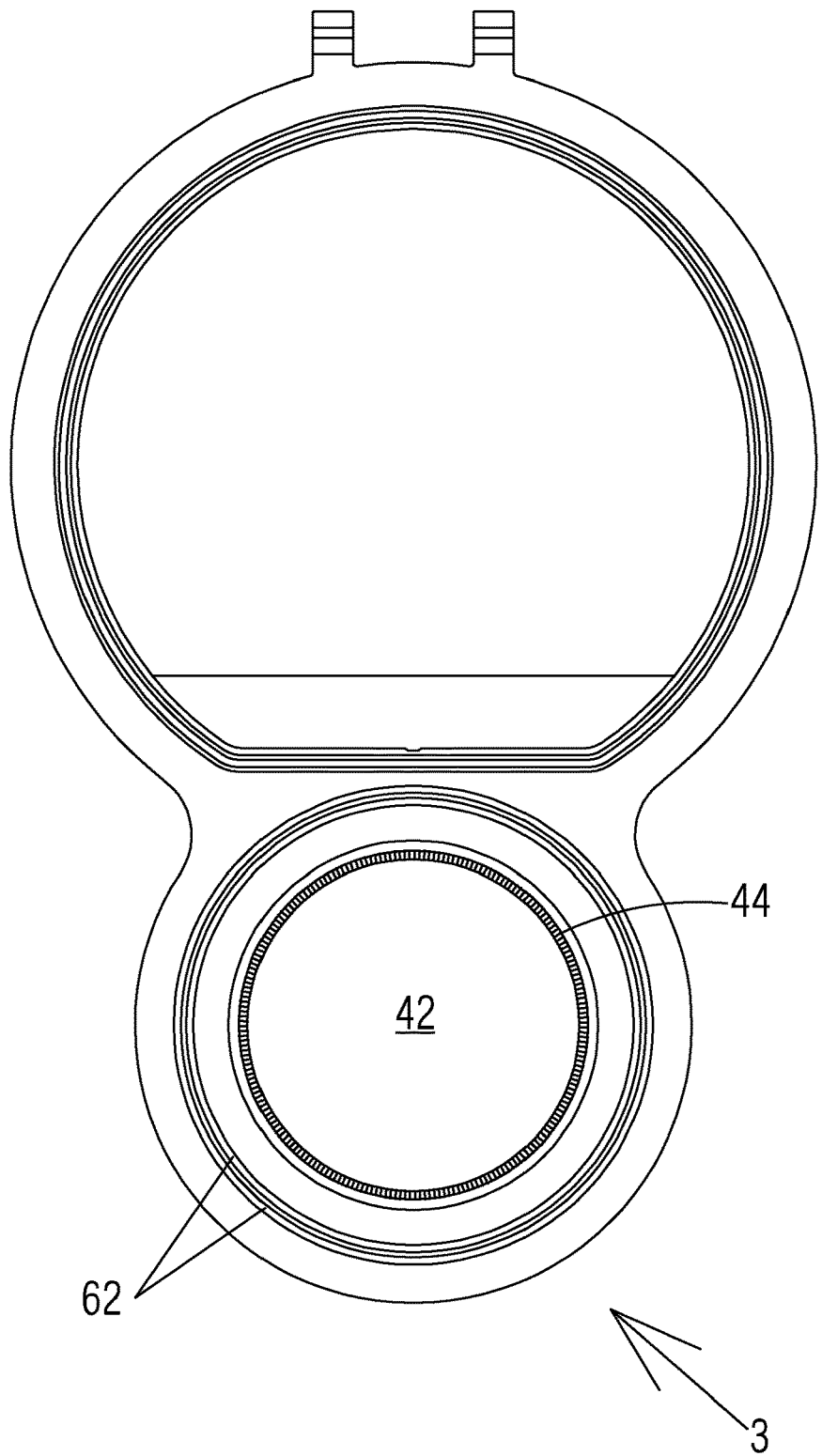
FIG. 7.—A schematic and plan view from below of a cover from the device of claim 1.
Figure 8:
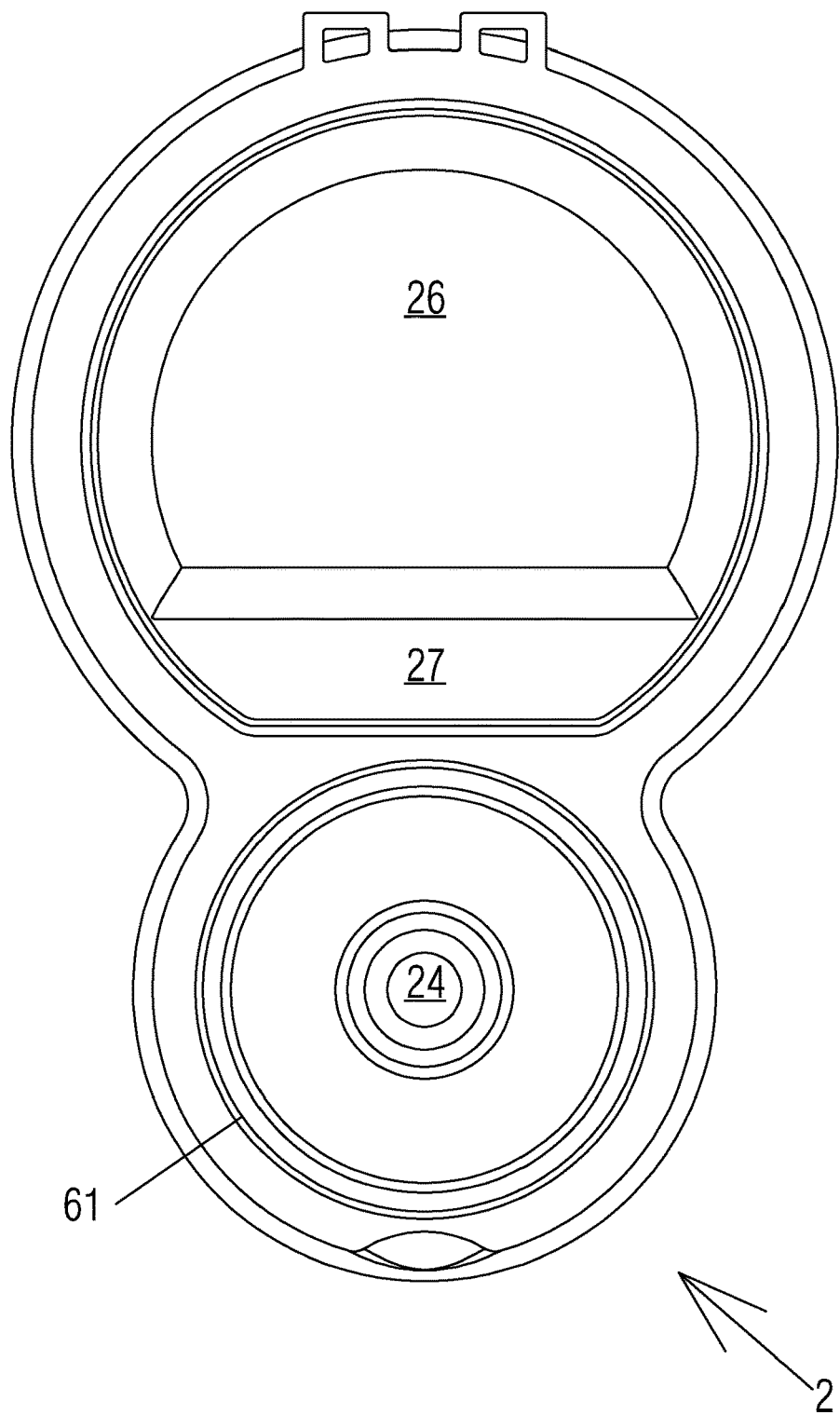
FIG. 8.—A schematic and plan view from above of a base from the device of claim 1.

In FIGS. 7 and 8 it can be seen that fastening means 61, 62 have been provided between the piston base body 51 and upper edges 25 of the lateral wall 22. These fastening means 61, 62 are configured to secure a sheet 200 in a coupled condition between the support 2 and the cover 3, as illustrated in FIG. 4.

The embodiment shown has fastening means 61, 62 that comprise a first ridge 61 provided on the upper edge 25 of the lateral wall 22 and at least a pair of second ridges 62 provided on the piston base body 51; said ridges being arranged such that the first ridge 61 is positioned between the second ridges 62 in a coupled condition. Inversely, there can be a pair of first ridges 61 provided on the upper edge 25 of the lateral wall 22 and a single second ridge 62 on the piston base body 51. In the present case, the predominant configuration of the different components that surround the capsule 100 is circular (since the exemplary capsules 100 have a circular layout), therefore the first and second ridges 61, 62 make a circular design when seen in plan view. In another alternative that is not illustrated, the fastening means 61, 62 will be able to be arranged only on the support 2 or on the piston base body 51.

The sheet 200 can be made of various materials, even though aluminum foil is preferred in the present embodiment.

Continuing with the description of the present invention, the cover 3 comprises compression means 7 partially arranged in the hollow 42 and capable of coming into contact with the sheet 200 in a coupled condition. The compression means 7 comprise a moldable body, dimensioned such that at least one portion of the moldable body is expandable between the capsule 100 and the cutting means 44 in a coupled condition, as will be seen later on. Moldable body should be understood as a body made up of a material with the ability to be compressed and easily return to its original shape when at rest; in other words, a material with optimal flexibility. In the present embodiment, the moldable body is made up of a sponge-shaped foam, although alternatively it can be made from a suitable gel. In any case, they will be materials that can be washed like normal dishware, even if they are not in contact with the food product to be refilled.

In FIGS. 3, 4 and 7 the cutting means 44 comprised in the piston body 41 have been represented, the cutting means 44 are oriented towards the cavity 23 of the support 2 when in use. Preferably, the cutting means 44 comprise toothing arranged on an edge of the piston body 41, more specifically on a circular edge of the piston body 41 endowed with sharp teeth for cutting a predetermined size and shape out of the sheet.

The piston body 41 and the cavity 23 are dimensioned such that said piston body 41 is capable of being partially introduced between the cavity 23 and the capsule 100 in a coupled condition. By means of the hollow 42 and of the flexible properties of the compression means 7, the piston body 41 is introduced in the cavity 23 with the cutting means 44 surrounding the capsule 100, as will be explained later on.

The piston body 41 comprises a button-type surface 45 on the end opposite to the end edge where the plurality of cutting teeth is provided. This surface 45 allows the user to easily apply a force FV in order to actuate the piston body 41, however it is evident for a person skilled in the art that this force can be applied automatically with any means that make it possible to push the piston body 41 in a sliding manner through the free passage 52 in order to introduce said piston body 41 in the cavity 23.

In order to achieve a refilling device 1 with a compact and practical design, the support 2 further comprises a storage receptacle 26 capable of receiving food ingredients, such as a ground coffee product P or any other ground ingredient that can be used for obtaining an infusion or the like in a machine available on the market. The cover 3 further comprises an enclosing bulge 31 for the storage receptacle 26. This bulge 31 therefore has a configuration complementary to the storage receptacle 26, and sealing means can be further arranged between both in order to ensure that the product P is kept in optimal preservation conditions. Preferably, the cavity 23 and the storage receptacle 26 are arranged contiguously on the same plane, in this way making it so the capsule 100 refilling and sealing operation is carried out even more efficiently.

The support 2 further comprises a straightening tab 27 connected to the storage receptacle 26, preferably arranged between said storage receptacle 26 and the cavity 23. In this way, the user can eliminate the left-over product P of the coffee ground in the path between the storage receptacle 26 and the cavity 23.

In FIGS. 1 and 3, it has been illustrated that the support 2 and the cover 3 are linked by a hinge-type articulation 11. This allows for the cover 3 to be opened and for easy access to the storage receptacle 26 and the cavity 23.

Even though in the present invention applying heat or adhesives is not necessary to achieve a resistant union between the capsule 100 and the sheet 200, if the conditions for capsule 100 infusion require it, for example at a relatively higher pressure or for hygienic reasons, the present refilling device 1 can comprise a heat sealing device (not represented) between the cover 3 and the support 2.

The material used for the manufacturing of the main elements of the invention is plastic, suitable for use with food. By way of variation, for example in the cutting means 7, toothing made from metal can be used.

In order to carry out the refilling operation of a capsule 100, preferably with the previous device, a beverage capsule 100 refilling method can be followed, comprising an ingredient filling phase in which the mouth of the capsule 100 to be refilled is oriented towards a mass of ingredient or product P and is partially introduced into said mass, such that the frustoconical cup 104 is refilled with product ingredient P through the application of a predetermined force FL on the lateral portions 101 of the frustoconical cup 104. This force FL causes the ground product P to adhere to the lateral portions 101 and not fall due to friction. The application of the force FL as well as the correct orientation of the capsule 100 and the fastening thereof can be done with adequate technical means for that purpose, which are not illustrated in the present embodiment. This filling operation is done with the cover 3 and the support 2 in a relative non-coupled condition such as in FIG. 3.

Figure 6A:
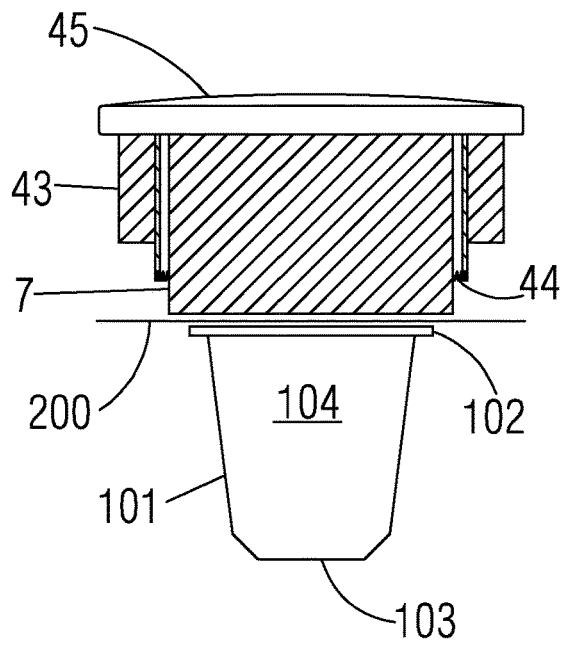
FIGS. 6A-6D.—Four schematic views of the details of the cutting and placing operations of a sheet in a capsule to be reused.

After the ingredient filling phase, the cup 104 is bound with a sealing sheet 200, by placing a sheet 200 of aluminum foil between the support 2 and the cover 3 (FIG. 6A). The aluminum foil does not need to be cut in a circular shape or any other shape that the capsule 100 may have. In this phase, the compression means 7 have not yet changed shape, given that they have not come into contact with the sheet 200. The cover 3 and the support 2 come to a coupled position. When the mutual coupled position between the cited elements has been reached, the fastening means 61, 62 are already working on the sheet 200 such that it stays caught and cannot move with respect to the correct position over the capsule 100 to be sealed.

Figure 6B:
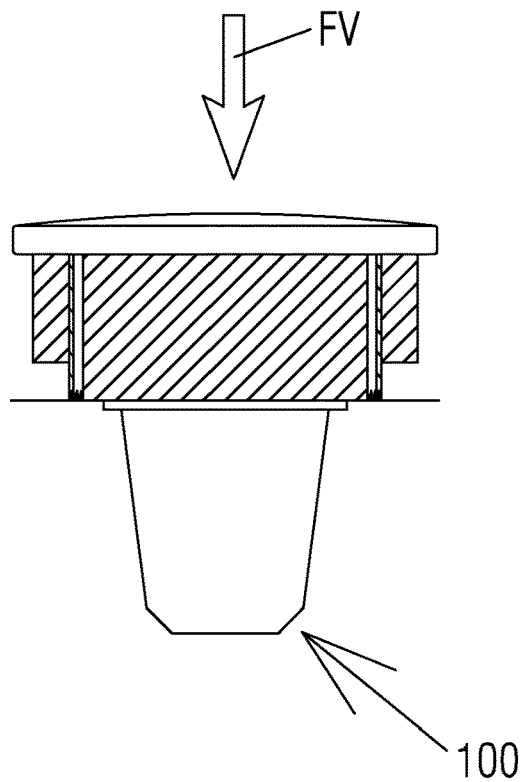

Afterwards, the piston body 41 is actuated in a direction towards the capsule 100 positioned in the cavity 23 in a coupled condition (FIG. 6B); the capsule 100 has been correctly positioned by means of the positioning means 24. The actuation of the piston body 41 is done by applying a force FV such as that represented in FIG. 6B, and implies that the compression means 7 have already started to be deformed given that the volume defined by the piston body 41 is reduced and the sheet 200 is still uncut. In this way, the sheet 200 stays secured by the fastening means 61, 62 and is tensed by means of the effects of the moldable body of the compression means 7.

Figure 6C:
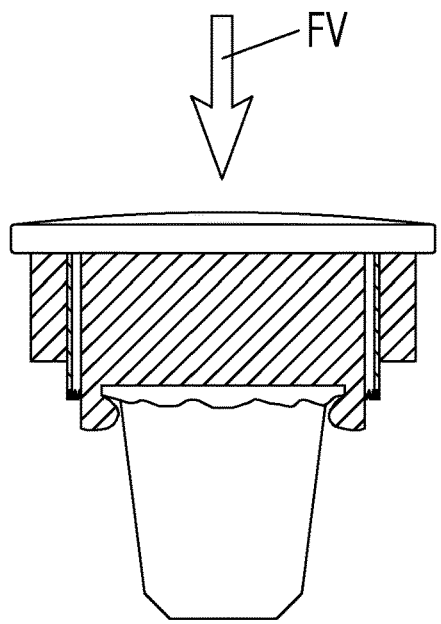
Figure 6D:
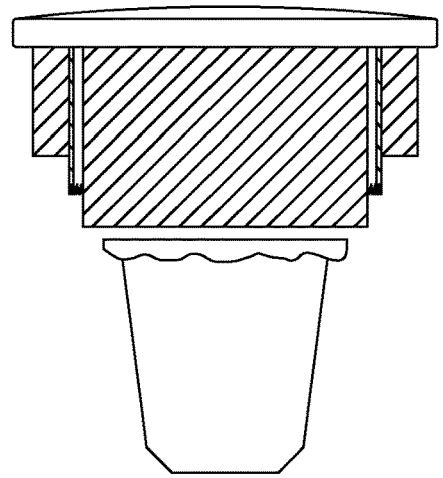

In FIG. 6C the sheet 200 is cut through the actuation of the piston body 41 with the force FV. This cut can be done in a single operation, facilitated by the cooperation between the fastening means 61, 62 and the compression means 7 on the sheet 200.

At this point the moldable body of the compression means 7 has already started to expand between the cup 104 and the piston body 41, in this way "pushing" in the direction of FV the sheet fringe 200 that has been generated in excess with respect to the edges 102. The outline of the cutting means 44 is greater than the outline of the capsule 100 considering the edges 102.

During the expansion of the compression means 7, the moldable body tries to recover its initial shape and volume such that it folds the excess sheet fringe 200 around the entire capsule 100 as seen in FIG. 6C.

Finally, the capsule 100 is refilled with the silver foil sheet 200 positioned by way of sealing. The user can already introduce the capsule 100 in the corresponding machine in order to make their beverage.

All of these steps can be summarized in two phases that a user or even automatized means (not shown) can easily carry out and that could include actuation means for the piston body 41, in which the user would only have to push a button or the like so the system would do the rest. The refilling phase would come first and afterwards, the actuating of the piston body 41; they are reduced from four to two.

In the state of the art, in other words without the present device, four separate actions had to be carried out in the capsule refilling process: refilling the coffee, cutting the aluminum foil, positioning the foil above the capsule and sealing.

The circular cutting or trimming of the aluminum foil and other materials is not simple, given that the risk of breakage is obvious. The combination of the cutting means 4, which in the present embodiment are an outside edge endowed with a ring of teeth, with fastening means 61, 62 and the compression means 7, allow for the circular trimming of the aluminum foil without risk of breakage.

The details, shapes, dimensions and other accessory elements used in the manufacture of the device of the invention may be conveniently replaced with others which do not depart from the scope defined by the claims which are included below.

The invention claimed is:

1. A beverage capsule refilling device, for use with capsules of the type that comprise a cup bindable to a sealing sheet, the beverage capsule refilling device comprising a support that in turn comprises a base bound at least to one lateral wall, thus defining a cavity able to house a capsule to be refilled, the support comprising positioning means for the capsule; the beverage capsule refilling device further comprising a cover for said cavity, the cover in turn comprising a piston body and a piston base body, in which the piston body has a hollow arranged at least partially along the piston body, and the piston base body comprises a free passage by way of an opening in which the piston body is arranged in a sliding manner, comprising elastic means between the piston body and the piston base body, fastening means for the sheet being provided that are configured to secure the sheet in a coupled condition between the support and the cover, the cover comprising compression means arranged at least partially in the hollow and capable of coming into contact with the sheet in a coupled condition, the piston body further comprises cutting means oriented towards the cavity of the support when in use, the piston body and the cavity being dimensioned such that said piston body is capable of being introduced at least partially between the cavity and the capsule in a coupled condition, the compression means comprising a moldable body dimensioned such that at least one portion of the moldable body is expandable between the capsule and the cutting means in a coupled condition.

2. The beverage capsule refilling device according to claim 1, wherein the support further comprises a storage receptacle capable of receiving food ingredients and the cover further comprises an enclosing bulge for covering the storage receptacle.

3. The beverage capsule refilling device according to claim 2, wherein the support further comprises a straightening tab connected to the storage receptacle.

4. The beverage capsule refilling device according to claim 2, wherein the cavity and the storage receptacle are arranged contiguously on the same plane.

5. The beverage capsule refilling device according to claim 1, wherein the support and the cover are linked by a hinge.

6. The beverage capsule refilling device according to claim 1, wherein the piston body comprises a pushable surface on an end opposite to the cutting means.

7. The beverage capsule refilling device according to claim 1, wherein the cutting means comprise toothing arranged on an edge of the piston body.

8. The beverage capsule refilling device according to claim 1, wherein the elastic means comprise a ring of elastic material arranged around the piston body.

9. The beverage capsule refilling device according to claim 1, wherein the elastic means comprise a helical spring arranged around the piston body.

10. The beverage capsule refilling device according to claim 1, wherein the positioning means comprise a depression or a projection on the base, configured to house, at least partially and in a male-female manner, a capsule to be refilled.

11. The beverage capsule refilling device according to claim 1, wherein the fastening means comprise at least a first ridge provided on the upper edge of the lateral wall and at least a pair of ridges provided on the piston base body; said ridges being arranged such that the first ridge is positioned between the second ridges in a coupled condition.

12. The beverage capsule refilling device according to claim 1, wherein the moldable body is made of a foam or a gel.

13. The beverage capsule refilling device according to claim 1, wherein the sheet to be applied is made of aluminum foil.

14. The beverage capsule refilling device according to claim 1, further comprising a heat sealing device between the cover and the support.

15. The beverage capsule refilling device according to claim 1, wherein the moldable body comprises a flexible material that is compressible and returns to an original shape when at rest.

16. The beverage capsule refilling device according to claim 1, wherein the moldable body comprises a material selected from a group of materials comprising a sponge-shaped foam or a gel.

17. A beverage capsule refilling device, for use with capsules of the type that comprise a cup bindable to a sealing sheet, the beverage capsule refilling device comprising a support that in turn comprises a base bound at least to one lateral wall, thus defining a cavity able to house a capsule to be refilled, the support comprising positioning means for the capsule; the beverage capsule refilling device further comprising a cover for said cavity, the cover in turn comprising a piston body and a piston base body, in which the piston body defines a hollow area arranged at least partially along the piston body, and the piston base body comprises a free passage by way of an opening in which the piston body is arranged in a sliding manner, the beverage capsule refilling device comprising elastic means between the piston body and the piston base body, fastening means for the sheet being provided that are configured to secure the sheet in a coupled condition between the support and the cover, the cover comprising compression means arranged at least partially in the hollow area and capable of coming into contact with the sheet in a coupled condition, the piston body further comprises cutting means oriented towards the cavity of the support when in use, the piston body and the cavity being dimensioned such that said piston body is capable of being introduced at least partially between the cavity and the capsule in a coupled condition, the compression means comprising a moldable body dimensioned such that at least one portion of the moldable body is expandable between the capsule and the cutting means in a coupled condition; and wherein the support further comprises a storage receptacle capable of receiving food ingredients and the cover further comprises an enclosing bulge for covering the storage receptacle.

\* \* \* \* \*